United States Patent [19]

Föhl

[11] Patent Number: 4,907,821
[45] Date of Patent: Mar. 13, 1990

[54] DEVICE FOR HEIGHT ADJUSTMENT OF AN ANCHORING FITTING FOR A SAFETY BELT

[75] Inventor: Artur Föhl, Schorndorf, Fed. Rep. of Germany

[73] Assignee: TRW Repa GmbH, Alfdorf, Fed. Rep. of Germany

[21] Appl. No.: 331,257

[22] Filed: Mar. 30, 1989

[30] Foreign Application Priority Data

Apr. 22, 1988 [DE] Fed. Rep. of Germany ....... 3813527

[51] Int. Cl.⁴ .................. B60R 22/20; B60R 22/46
[52] U.S. Cl. .................................. 280/808; 280/806; 297/483; 297/486; 297/480
[58] Field of Search ............... 280/801, 806, 808; 297/483, 486, 480

[56] References Cited

U.S. PATENT DOCUMENTS

| 4,536,011 | 8/1985 | Ono | 280/808 |
| 4,552,408 | 11/1985 | Ono | 280/808 |
| 4,610,464 | 9/1986 | Yasumatsu et al. | 280/808 |
| 4,652,012 | 3/1987 | Biller et al. | 280/808 |
| 4,681,347 | 7/1987 | Tamura et al. | 280/808 |

FOREIGN PATENT DOCUMENTS 8412788  9/1984  Fed. Rep. of Germany.
3406047  2/1985  Fed. Rep. of Germany.

Primary Examiner—Kenneth R. Rice
Attorney, Agent, or Firm—Tarolli, Sundheim & Covell

[57] ABSTRACT

A height adjustment device is provided which is suitable for combination with a webbing tightener. Unintentional release of the locking engagement by the downwardly directed inertia forces on the slide are avoided in that by means of a compensating mass a compensation force is generated which simultaneously acts on the slide and opposes the inertia forces of the latter. A two-armed lever which is pivotally mounted in its center and to the one end of which the compensating mass is secured converts the downwardly directed inertia forces originating from the compensating mass to an upwardly directed compensation force acting on the slide.

6 Claims, 2 Drawing Sheets

DEVICE FOR HEIGHT ADJUSTMENT OF AN ANCHORING FITTING FOR A SAFETY BELT

The present invention relates to a device for the height adjustment of an anchoring fitting in a safety belt system for motor vehicles. More particularly, the invention relates to a device which comprises a loadbearing fitting member which is displaceable in a guide rail to be secured to the vehicle and a detent means for releasable locking engagement of the fitting member at a selected detent element of the guide rail, an actuating element being provided which on movement of the loadbearing fitting member is entrained by the latter. For releasing the locking engagement the actuating element is movable with a release stroke in the same direction as the intended adjustment movement relatively to the fitting member.

A device of this type is described in DE-OS No. 3,406,047. The manipulation of said device is particularly simple because on manual adjustment both in the upward and the downward direction the release of the locking takes place by actuation of the grip in the same direction as the intended adjustment movement. In combination with conventional safety belt automatic retractors such devices operate very satisfactorily.

It has now been found that the combination of such a height adjustment device with conventional belt tighteners arranged on automatic safety belt retractors is problematical. The function of belt tighteners is to pull the belt slack out of the safety belt system within a few milliseconds in the event of a collision. On activation of the belt tightener in the webbing downwardly deflected by the deflection fitting a sudden high tension occurs which is directed downwardly towards the safety belt retractor.

If now the loadbearing fitting member of the height adjustment device has remained located between two detent elements of the guide rail, as can happen in practice, due to the high tensile load the fitting member is suddenly pulled downwardly until the detent means encounters the next-lower detent element of the guide rail. The downward movement of the loadbearing fitting member and the simultaneously entrained parts is suddenly retarded The slide movable relatively to the loadbearing fitting member and the grip engaging said slide continues to move downwardly due to its inertia However, this downward movement with the fitting member blocked is the same movement which is necessary to release the locking. Consequently, an effective locking at the next-lower detent element of the guide rail does not take place, instead, the fitting member immediately again leaves the next-lower detent position and moves to the following next-lower detent element, where the same process can repeat itself until the fitting member has reached the lowermost end of the guide rail.

The present invention provides a device for the height adjustment of the anchoring fitting in a safety belt system for motor vehicles which is secured against unintentional release of the locking when a sudden downwardly directed tensile load acts on the fitting member and is therefore in particular suitable for combination with a conventional belt tightener.

According to the invention a height adjustment device of the type defined at the outset is provided wherein a compensation mass is associated with the actuating element, said compensation mass, on movement of the loadbearing fitting member, being entrained by the latter to generate inertial forces which are opposite to the forces generated by the inertia of the actuating element and the parts moving therewith. The downwardly directed inertia forces occurring at the actuating element when the downward movement of the loadbearing fitting member is suddenly retarded at a detent element of the guide rail are compensated by the compensation forces generated by the inertia of the compensation mass at least to such an extent that the resultant downwardly directed force is not great enough to release the locking. The fitting member is therefore reliably blocked at the next-lower detent element of the guide rail.

The invention makes possible for the first time the combination of a height adjustment device according to the preamble with a webbing tightening means disposed beneath the loadbearing fitting member carrying the deflection fitting. Without the construction of the height adjustment device according to the invention the combination thereof with a webbing tightening means would have the defect that in the event of tightening an unintentional downward movement of the deflection fitting to the lower stop of the guide rail can occur. This danger is eliminated in simple manner with the invention.

In a particularly simple embodiment which permits easy integration in existing height adjustment devices in which the actuating element is constructed as slide displaceable on the loadbearing fitting member, a deflection means is provided which converts the forces caused by inertia of the compensating mass to suitably orientated compensation forces and comprises a two-armed lever having a pivot bearing preferably supported at the fitting member. The supporting in an advantageous further development is by a fork-like bearing member secured to the fitting member and a pin extending transversely through said bearing member and the lever.

Further advantages and features of the invention will be apparent from the following description of a practical embodiment and from the drawings to which reference is made and in which.

Figure 2:
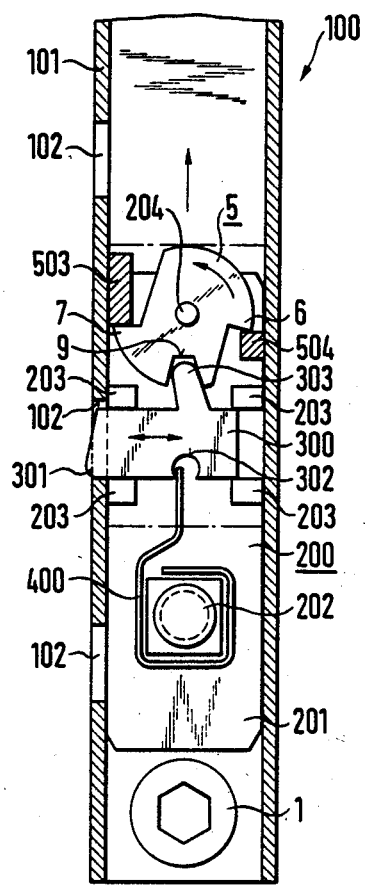
FIG. 2 is a longitudinal section along the line II—II of FIG. 3.

The device for height adjustment of an anchoring fitting for a safety belt is provided with a C-shaped elongated guide rail 100 which can be secured in vertical arrangement by means of a screw 1 for example to the centre post of a motor vehicle. Said guide rail 100 comprises on a laterally bent flank 101 rectangular detent openings 102 lying at intervals above each other. An elongated plate-like fitting member 200 is guided longitudinally displaceably in the interior of said guide rail 100 and comprises at the lower end a bent portion 201 with which the fitting member 200 is guided at the C-shaped bent sides 103 of the guide rail 100. In the vicinity of this bent portion 201, likewise at the lower end of the fitting member 200, there is a threaded stud 202 with square foot portion and a threaded extension on which a deflection fitting 2 in the form of a substantially U-shaped bent sheet metal member can be secured by means of a nut 3. The deflection fitting 2 serves for deflecting webbing 4 coming from an automatic retractor, which is not shown, and led from said fitting round the body of the vehicle occupant to be secured. The fitting member 200 comprises stud-like stamped bearing lugs 203 which serve to guide a plate-like pawl 300. Said pawl 300 comprises a sawtooth-like detent end 301, a coupling groove 302 and a driver dog 303 on the opposite side. The pawl 300 is displaceable in the direction of the arrow in FIG. 2 transversely of the displacement path of the fitting member 200 between the bearing lugs 203 into a locking position which is shown in FIG. 2 and in which the tooth-like detent end 301 projects into the detent opening 102 and into a position outside said detent opening. 400 denotes a form spring of flat material which is non-rotatably mounted on the square foot portion of the threaded stud 202 by means of a square configuration. With its free end said spring engages into the coupling groove 302 of the pawl 300 and thereby presses the pawl 300 into the locking position. Mounted freely rotatably on a bearing pin 204 of the fitting member 200 is a cam disk 5 which comprises at diametrically opposite points tooth-like cams 6 and 7 and is provided therebetween with a driver groove 9 into which the driver dog 303 of the pawl 300 engages. An actuating element constructed as slide 500 is mounted displaceably, also in the displacement direction, on the guide rail 100. The slide 500 bears on the sides 103 of the guide rail 100 and has a grip 502. The slide 500 comprises at the face facing the guide rail 100 and the fitting member 200 two cam lugs 503 and 504 which are shown as detail in FIG. 2 detached from the slide 500. These cam lugs 503 and 504 are associated directly with the cams 6 and 7 of the cam disk 5 and lie in the path of movement thereof. On actuation of the slide 500 in the displacement direction 10 the cam lug 504 presses the cam 6 upwardly and the cam disk 5 rotates in the direction of the arrow, the pawl 300 being moved out of the locking position inwardly. The fitting member 200 is now free in the displacement direction and can be displaced up to the next detent opening 102 until said higher detent opening 102 is reached and on release of the grip 502 the pawl 300 again comes into locking engagement with said detent opening 102. If the slide 500 is displaced downwardly in the displacement direction 11 the engagement of the cam lug 503 on the cam 7 of the cam disk 5 causes the latter to be pivoted in the same sense in the direction of the arrow so that once again the pawl 300 is withdrawn until it is outside the locking position. Via the slide 500 the fitting 200 can once again be displaced up to the next-lower detent opening 102 where the pawl 300 is again pressed by the spring 400 into the locking position.

Figure 1:
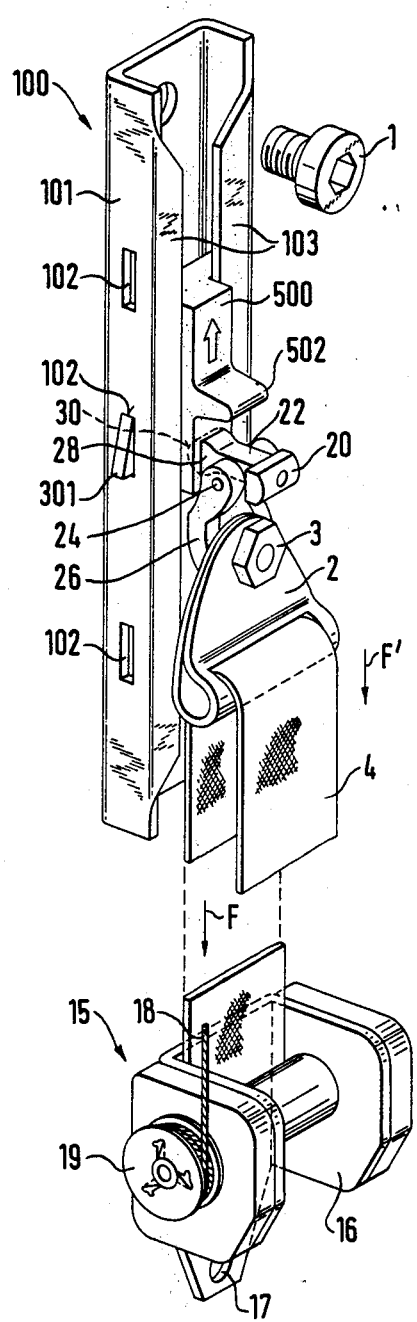
FIG. 1 is a schematic perspective view of a height adjustment device.
Figure 3:
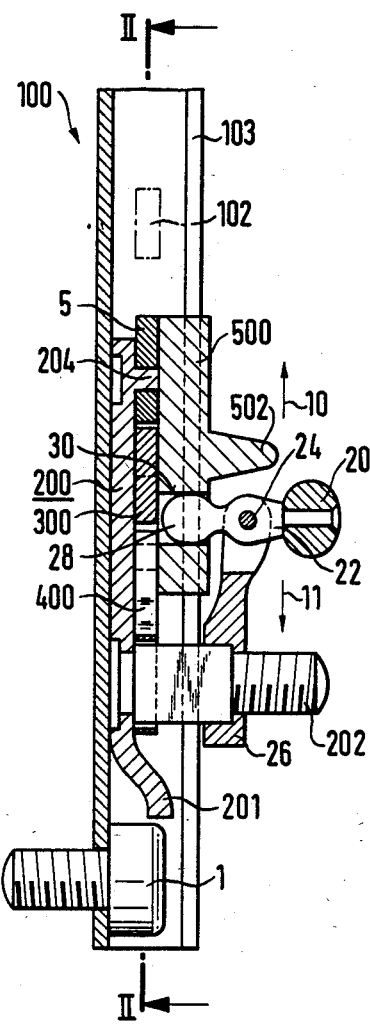
FIG. 3 is a longitudinal section of the device shown in FIG. 1.
Figure 4:
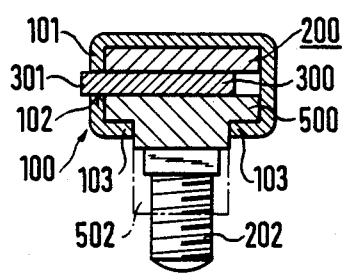
FIG. 4 is a cross-section of the device shown in FIGS. 1 to 3.

The height adjustment device shown in FIGS. 1 to 3 is used in combination with a webbing tightener 5 likewise shown in FIG. 1. It is arranged on a belt retractor having a U-shaped frame 6 which is secured by means of an eye 7 to the B post of a motor vehicle. The tightening drive (not shown) engages via a pulling cable 8 on a pulley 9 fitted onto a lateral extension of the belt reel. Details of such a webbing tightener, described here only by way of example, will be found in German application No. 3,131,637.

In the event of tightening the webbing tightener 5 generates a sudden downwardly directed tensile force F in the webbing 4 so that at the deflection fitting 2 a likewise downwardly directed tensile force F' occurs. When the detent end 301 engages as shown in FIG. 1 into one of the detent openings 102 the locking withstands the downwardly directed tensile force F'. If however, which can certainly occur in practice, the detent end 301 is not in engagement in one of the detent openings 102 but in an intermediate position therebetween the loadbearing fitting member 200 is pulled abruptly downwardly until the detent end 301 drops into the next-lower detent opening 102. The downward movement of the fitting member 200 is then abruptly retarded. Due to its inertia the slide 500 tends to continue its downward movement. To prevent such an unintended downward movement of the slide 500, which would lead to release of the locking, a compensating mass 20 is provided which is moved together with the fitting member 200 and the inertia of which is converted by a converting means to an upwardly directed compensating force which acts on the slide 500. The compensating mass 20 is mounted on the one end of a two-armed lever 22 which is pivotally mounted in its centre about a pin 24 between the two legs of a fork-like bearing member 26. The bearing member 26 is connected in the region of the threaded stud 202 rigidly to the loadbearing fitting member 200. At its end remote from the compensating mass 20 the lever 22 is provided with a spherical or partially cylindrical end piece 28 which engages into a correspondingly formed recess 30 of the slide 500. The two-armed pivotally mounted lever 22 forms a converting means which converts the downwardly directed inertia forces occurring at the compensating mass 20 to an upwardly directed compensating force acting on the slide 500. The lever 22 and its end piece 28 are made from a relatively light material whilst the compensating mass 20 consists of a material of higher density. The dimensioning of the compensating mass 20 depends on the mass of the slide 500 and the parts movable therewith and on the ratio of the two arms of the lever 22. The compensating force which can be generated by the compensating mass should substantially compensate the inertia forces occurring on sudden retarding of the fitting member 200 and acting on the slide 500.

The idea of the invention is also applicable to constructions of height adjustment means in which the actuating element comprises an angled lever which is pivotally mounted on the loadbearing fitting member and on the one arm of which a detent nose co-operating with the detent elements of the guide rail is arranged. The compensating mass can then be attached directly to said arm carrying the detent nose or formed by suitable dimensioning and mass distribution of the angled lever.

I claim:

1. Device for height adjustment of an anchoring fitting in a safety belt system for motor vehicles comprising a guide rail to be secured to the vehicle and provided with a plurality of detent elements at different heights, a loadbearing fitting member which is displaceable in said guide rail, a detent means for releasable locking of said fitting member at a selected one of said detent elements of the guide rail and an actuating element mounted on said loadbearing fitting member for releasing locking engagement between said detent means and said selected detent element by performing a movement in the same direction as an intended adjustment movement relatively to said fitting member, a compensation mass being associated with said actuating element to provide an inertial force communicated to said actuating member with an orientation opposite to inertial forces generated by inertia of said actuating element upon movement of said loadbearing fitting member.

2. Device according to claim 1, wherein said actuating element comprises a slide which is displaceably mounted on said loadbearing fitting member, said compensating mass being mounted on a first end of a two-armed lever, the second end of which engages said actuating element.

3. Device according to claim 2, wherein said two-armed lever is pivotally mounted on said fitting member.

4. Device according to claim 2, wherein said two-armed lever comprises a spherical or partially cylindrical end piece on said second end which engages into a correspondingly formed recess of said slide.

5. Device according to claim 3, wherein said fitting member has a fork-like bearing member with two parallel legs, said lever being pivotally mounted between said legs.

6. Device according to claim 1, wherein a webbing tightener of the said safety belt system is arranged beneath said loadbearing fitting member, a deflection fitting being mounted on said fitting member.

* * * * *